Feb. 8, 1949.　　M. L. FLINSPACH ET AL　　2,461,111
SOIL MOISTURE INDICATOR
Filed Aug. 16, 1946
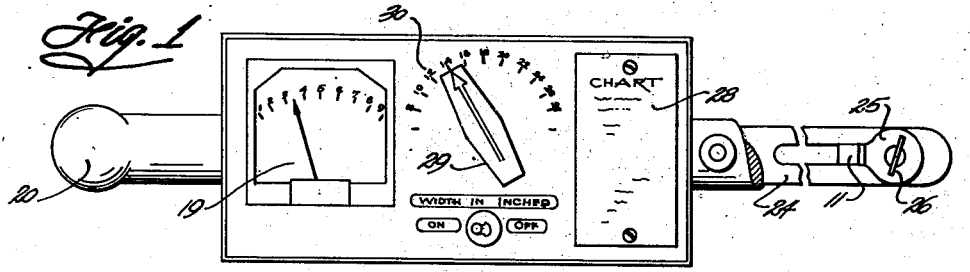
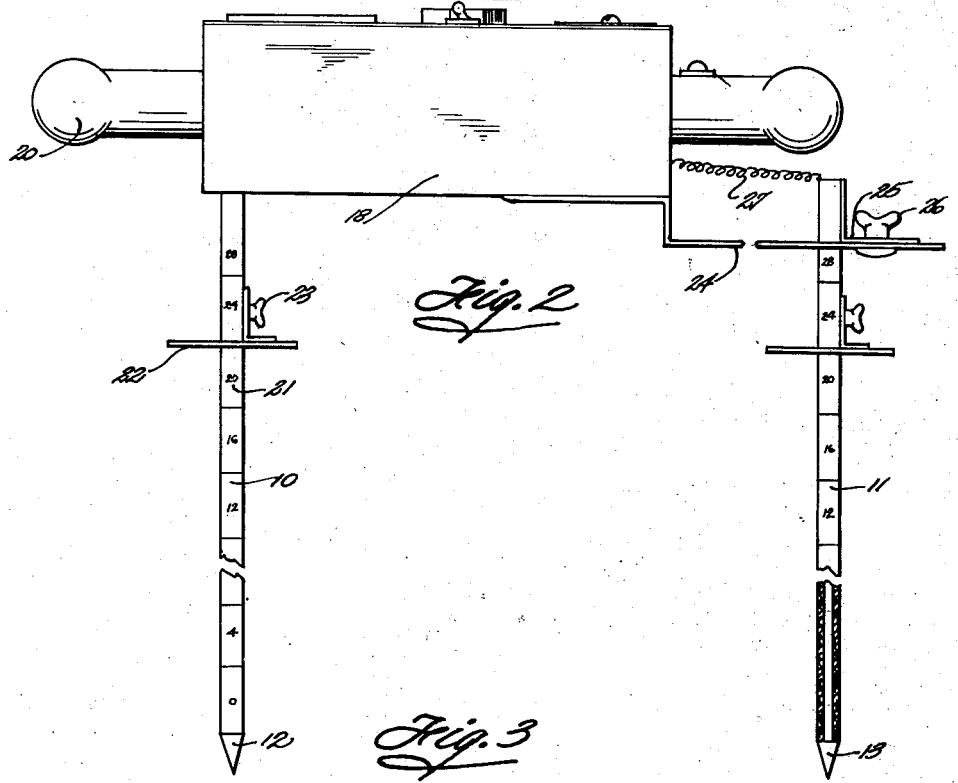
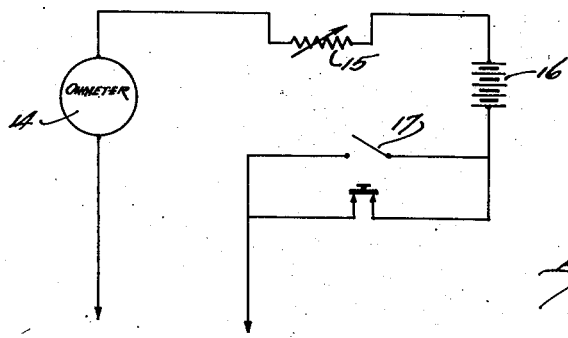
Inventors
MACK L. FLINSPACH
JOHN H. FLINSPACH
By Hazard and Miller
Attorneys Patented Feb. 8, 1949

2,461,111

UNITED STATES PATENT OFFICE 2,461,111

SOIL MOISTURE INDICATOR

Mack L. Flinspach and John H. Flinspach, Compton, Calif.

Application August 16, 1946, Serial No. 690,857

3 Claims. (Cl. 175—183)

This invention relates to a means and method of determining the approximate moisture content in soils.

It is now becoming recognized that in order to grow fruits and vegetables the moisture content of the soil should be maintained as closely as possible to a suitable optimum condition for the particular type of fruit or vegetable being grown. Thus certain fruit-type vegetables require a higher normal moisture content in the soil than other vegetables and the same applies to various types of fruits. When the soil moisture content most suitable for a given plant is ascertained it is then desirable to maintain the soil moisture content in this condition to promote maximum growth. Serious fluctuations in the soil moisture content from the optimum condition have a tendency to retard such growth.

In various localities and particularly in the southwestern part of the United States where irrigation is resorted to, it is desirable to be able to readily ascertain the moisture content in the soil so that when the moisture content decreases below the optimum conditions for growth of the plants being raised, this condition can be corrected by resorting to irrigation.

It is an object of the present invention to provide a simple means and method of determining with reasonable accuracy the moisture content of soil at the surface or at any desired depth and to also be able to determine the average moisture content between two spaced points that may be adjusted as to their spacing so that the moisture content across a selected row may be ascertained.

Another object of the invention is to provide an apparatus consisting essentially of two spaced insulating stakes each of which carries an electrode, the stakes being adjustable as to the distance therebetween and having adustable stops for limiting the depth to which they may be thrust into the ground and to provide an electric circuit for measuring the resistance between the electrodes whereby the resistance between the electrodes may be evaluated in terms of soil moisture content by comparing it with known resistance readings of similar soils whose soil moisture content is known.

It will be appreciated that by varying the distance between the electrodes the resistance to the flow of electric current therebetween will vary. It is a further object of the invention to provide the electric circuit with a compensating variable resistance the control of which traverses a scale calibrated in terms of different distances between the electrodes so that on adjusting the spacing between the electrodes the change in resistance due to the change of spacing may be automatically compensated for by the variable resistance.

With the foregoing and other objects in view, which will be made manifest in the following detailed description and specifically pointed out in the appended claims, reference is had to the accompanying drawings for an illustrative embodiment of the invention, wherein:

Figure 1 is a top plan view of a soil moisture indicator embodying the present invention;

Fig. 2 is a view in side elevation of the same;

Fig. 3 is a wiring diagram.

Referring to the accompanying drawings wherein similar reference characters designate similar parts throughout, the soil moisture indicator as illustrated comprises two spaced stakes 10 and 11. These stakes may be formed of insulating material such as wood or plastic or the equivalent. On the lower ends of these stakes there are pointed metallic electrodes 12 and 13 which are electrically connected through or along the stakes to an electric circuit including an ohmmeter 14, a variable resistance 15 and a source of electric current 16. The circuit may also include one or more switches 17. The source of electric current may be either a wet or dry battery, or any other source suitable for the purpose may be employed. The source of electric current, the variable resistance and the ohmmeter are preferably enclosed within a housing or container 18 with the needle of the ohmmeter visible through a window 19 therein. This container or housing is preferably equipped with handles 20 to facilitate the forcing of the stakes 10 and 11 into the soil that is to be measured. On the stakes 10 and 11 there are suitable calibrations indicated at 21, preferably in inches, to indicate the position of vertically adjustable stops 22 which can be set in adjusted position such as by thumb screws 23. These stops are intended to engage the surface of the soil and to limit the depth to which the electrodes 12 and 13 are thrust into the soil. Either or both of the stakes are adjustable toward and away from the other. Thus stake 11 has been illustrated as being mounted on a bracket 24 on the container and being slidable outwardly thereon by means of a slide 25. This slide may be set in any adjusted position by tightening a thumb screw 26. The upper end of this stake is shown as having a conductor 27 connected thereto so as to be electrically connected to its electrode 13. Either or both of the stakes may be completely detached from the container 18 and separately driven into the soil at considerable distances from each other such as is required in obtaining the soil moisture content in an orchard or grove. Under these circumstances the stakes are driven into the soil on opposite sides of a tree row.

There is preferably mounted on the container a suitable chart 28 which serves to evaluate in terms of soil moisture content the reading obtained from the ohmmeter 14. This chart is prepared from resistance readings on similar soils whose soil moisture content is known. The control handle 29 for the variable resistance 15 is arranged to traverse a scale 30 on the container which is calibrated in terms of distance between the electrodes 12 and 13. It will be appreciated that if the distance between these electrodes is increased the resistance to the flow of electric current through the soil between the electrodes will likewise increase and by having this control traverse the scale calibrated in terms of distance the variable resistance 15 may be adjusted to automatically compensate for the increased resistance of the soil occasioned by the increasing of the distance between the electrodes 12 and 13.

When it is desired to determine the soil moisture content of a given field in which small short-rooted vegetables are being grown, the stakes 10 and 11 are adjusted so as to span one selected row. The stops 22 are also adjusted to limit the depth of the electrodes to a distance commensurate with the root depth. The control 29 is then adjusted to adjust the variable resistance 15 commensurate with the distance between the electrodes 12 and 13. The switch 17 is then closed and the ohmmeter 14 is read. By evaluating this reading on the chart 28 the average soil moisture content may be ascertained. The device may be used at various typical points over the entire field to determine the average soil moisture content and if the moisture content is low it may be corrected by irrigation. If high, it may be corrected by appropriate steps of cultivation. The spacing of the stakes 10 and 11 will, of course, vary with the spacing of the rows. Thus as for example the spacing between the stakes 10 and 11 will be considerably greater in determining the soil moisture content of a field planted to tomatoes than to a field planted to radishes or carrots, in a similar manner the depth to which the electrodes 12 and 13 are thrust into the soil will be greater in the case of tomatoes than in the case of radishes.

While the device as illustrated is intended to be readily portable and carried from one point to another over a given field, it will be readily appreciated that the method of determining the soil moisture content can be performed by other types of apparatus. For example, pairs of electrodes 12 and 13 may be permanently embedded in the soil at various localities and conductors lead therefrom to a single instrument housing 18 at a central or primary location. These conductors leading from the various pairs of embedded electrodes may be selectively connected to the instrument and the soil moisture content evaluated throughout the entire field by measuring the resistance between the electrodes of each pair. Under such circumstances an additional chart may have to be provided to modify the scale 30 for different pairs of electrodes. Thus a more remote pair of electrodes having long conductors leading to the instrument will have to be compensated for by the variable resistance to a greater extent than where the pairs of electrodes are located closer to the instrument and consequently have shorter conductors leading thereto.

From the above described method and construction it will be appreciated that the soil moisture content may be easily ascertained with a high degree of accuracy so that correct steps may be taken to correct the soil moisture content to promote maximum growth.

Various changes may be made in the details of construction without departing from the spirit and scope of the invention as defined by the appended claims.

We claim:

1. A soil moisture indicator comprising a frame, two stakes having electrodes on their lower ends and being connected to said frame in spaced relation near their upper ends, said stakes being adjustable as to the distance therebetween, handles for said frame adapting said stakes to be thrust into the soil by their lower ends, a source of electric current located on said frame and connectable to said electrodes, a resistance measuring means in the circuit having a variable resistance in circuit therewith operable by a control traversing a scale graduated in terms of the spacing of the electrodes, said variable resistance being mounted on said frame and said resistance measuring means, scale and control being so mounted on said frame as to be readily visible and utilized.

2. A soil moisture indicator comprising a frame, two stakes having electrodes on their lower ends and being connected to said frame in spaced relation near their upper ends and being adjustable as to the distance therebetween, handles for said frame adapting the stakes to be thrust into the soil by their lower ends, said stakes having adjustable stops thereon for limiting the depth to which the electrodes may be thrust into the soil, and having means thereon for indicating the depth to which the electrodes are thrust into the soil, a source of electric current located on said frame and connectable to said electrodes, a resistance measuring means in the circuit and having a variable resistance in circuit therewith operable by a control traversing a scale graduated in terms of the spacing of the electrodes, said variable resistance being mounted on said frame and said measuring means, scale and control being mounted on said frame as to be easily visible and utilized.

3. A soil moisture indicator comprising a frame, a pair of electrodes supported from the frame in spaced relation with respect to one another, the electrodes being adjustable as to the distance therebetween, means adjustable along the electrodes serving to limit the depth to which the electrodes may be thrust into the soil, handles on the frame adapting the electrodes to be thrust into the soil by their lower ends, a source of electric current located on said frame and connectible to said electrodes, a resistance measuring means in the circuit having a variable resistance in circuit therewith operable by a control traversing a scale graduated in terms of the spacing of the electrodes, said variable resistance being mounted on said frame and said resistance measuring means, scale and control being so mounted on said frame as to be readily visible and utilized.

MACK L. FLINSPACH.
JOHN H. FLINSPACH.

REFERENCES CITED

The following references are of record in the file of this patent:

UNITED STATES PATENTS

| Number | Name | Date |
| --- | --- | --- |
| 1,089,030 | Angell | Mar. 3, 1914 |
| 1,610,563 | McIlvaine | Dec. 14, 1926 |
| 1,744,120 | Ives | Jan. 21, 1930 |
| 1,826,247 | Heppenstall | Oct. 6, 1931 |
| 1,978,440 | Shepard | Oct. 30, 1934 |
| 2,371,176 | Kirk et al. | Mar. 13, 1945 |